United States Patent [19]

Lee

[11] Patent Number: 5,692,149
[45] Date of Patent: Nov. 25, 1997

[54] BLOCK REPLACEMENT METHOD IN CACHE ONLY MEMORY ARCHITECTURE MULTIPROCESSOR

[75] Inventor: Gyungho Lee, Plymouth, Minn.

[73] Assignees: Samsung Electronics Co., Ltd., Suwon, Rep. of Korea; University of Minnesota, Minneapolis, Minn.

[21] Appl. No.: 405,335

[22] Filed: Mar. 16, 1995

[51] Int. Cl.$^6$ .................................................. G06F 12/12
[52] U.S. Cl. ............................................. 395/460; 395/468
[58] Field of Search .............................. 395/468, 471, 395/472, 460, 486, 485, 478, 461, 470

[56] References Cited

U.S. PATENT DOCUMENTS

| | | | |
|---|---|---|---|
| 5,113,514 | 5/1992 | Albonesi et al. | 395/471 |
| 5,297,265 | 3/1994 | Frank et al. | 395/412 |
| 5,303,362 | 4/1994 | Butts, Jr. et al. | 395/448 |
| 5,394,555 | 2/1995 | Hunter et al. | 395/800 |
| 5,522,058 | 5/1996 | Iwasa et al. | 395/472 |
| 5,524,212 | 6/1996 | Somani et al. | 395/200.08 |

OTHER PUBLICATIONS

A. Saulsbury et al., "An Argument for Simple COMA," Proceedings of the First IEEE Symposium on High Performance Computer Architecture, pp. 276–285.

*Primary Examiner*—Eddie P. Chan
*Assistant Examiner*—Kevin L. Ellis
*Attorney, Agent, or Firm*—Cushman Darby & Cushman Intellectual Property Group of Pillsbury Madison & Sutro LLP

[57] ABSTRACT

A block replacement method for use in a bus-based cache only memory architecture multiprocessor, is invoked when a block in a local memory of a first processing node in the multiprocessor is to be replaced to make a space for an incoming block supplied via a system bus from a local memory of a second processing node in the multiprocessor, and includes the following steps: (a) if the block of the first processing node is in an invalid state, or in a shared state, overwriting the block of the first processing node with the incoming block from the second processing node; (b) if the block of the first processing node is in an exclusive state, or in a shared owner state, relocating the block of the first processing node to a third processing node in the multiprocessor, selected in accordance with a predetermined priority scheme, and then overwriting the block of the first processing node with the incoming block from the second processing node; and (c) if the third single processing node cannot be determined among the processing nodes in the multiprocessor with the predetermined priority scheme in step (b), swapping the block of the first processing node for the incoming block from the second processing node.

8 Claims, 5 Drawing Sheets

BLOCK REPLACEMENT METHOD IN CACHE ONLY MEMORY ARCHITECTURE MULTIPROCESSOR

FIELD OF THE INVENTION

The present invention relates to multiprocessors; and, more particularly, to an improved block replacement method for use in a bus-based multiprocessor employing cache only memory architecture.

DESCRIPTION OF THE PRIOR ART

Multiprocessing is a technique commonly used to increase a system computing power beyond the limit of current uniprocessor technology. In a multiprocessor, multiple instruction streams are executed in parallel, and both communication and synchronization between processing nodes are accomplished by passing messages or sharing memories.

Message-passing machines, commonly referred to as multicomputers, are highly scalable and may be implemented in a wide variety of interconnection topologies. However, because inter-processor communication must be explicit, these machines are difficult to program. In contrast, shared memory machines provide a simplified programming model via implicit interprocessor communication.

Structurally, shared memory machines have developed into two distinct memory classifications: centralized and distributed. The centralized model has a physically centralized memory providing a uniform memory access for each processing node. However, the performance and scalability of a centralized shared-memory machine are limited primarily due to the contention for shared resources, such as a common memory and bus.

In contrast, in the distributed model, a global address space is physically distributed among processing nodes. Memory access latency varies between local and remote memories, yielding non-uniform memory access. Distributed shared-memory machines reduce the number of remote memory requests by forcing a memory local to a processing node to contain the most likely information to be accessed. The high utilization of local memories lowers the average access time and global traffic; and, accordingly, increases the performance and scalability of the system. Unfortunately, however, static distribution of program and data over local memories is often required to realize an efficient local memory utilization. This imposes constraints in the programming of the distributed shared-memory machines that may require programmers and/or operating systems to better understand the underlying structures.

Cache only memory architecture removes the problems associated with static distribution in the distributed model. In a cache only memory architecture machine, like a distributed shared-memory machine, each processing node holds a portion of a global shared memory. However, the local memory associated with each processing node is augmented to act as a large cache. As a result, this architecture allows automatic migration and replication of program and data to processing nodes where they are referenced, eliminating the need for static partitioning of program and data while enjoying increased performance and scalability as in the distributed model. Examples of known cache only memory architecture machines include the Swedish Institute of Computer Science's Data Diffusion Machine (DDM), a description of which can be found in E. Hatersten, A. Landin and S. Haridi, *"DDM-A Cache-Only Memory Architecture,"* IEEE Computer September 1992, pp. 44–54., and Kendall Square Research's KSR1 machine, a description of which can be found in H. Burkhardt III et al., *"Overview of the KSR1 computer system,"* Technical Report KSR-TR-9202001, Kendall Square Research, February 1992.

In such cache only memory architecture machines, since the local memory associated with each processing node acts as a cache to the global shared memory, a replacement of data can occur in the local memory as in ordinary caches. Such data replacement takes place when data already resident in the local memory has to be removed to make a space for data incoming to satisfy a miss in the local memory. However, in cache only memory architecture machines, unlike centralized and distributed shared-memory machines, there is no backing main memory where the replaced data can be written back. This introduces issues that are unique to cache only memory architecture machines. For example, data, even if it is not modified locally, cannot simply be deleted unless there is guarantee that there remains at least one valid copy of the data in the system. One also has to devise a method for determining where to place the replaced data.

A conventional data replacement policy for a cache only memory architecture machine can be found in the description of the DDM, the DDM has a hierarchical bus interconnection network with processing nodes at the bottom of hierarchy. Directories at each higher level contain coherence information on the data in the sub-hierarchy below. In the DDM replacement policy, a shared block, i.e., a block of data shared with some other processing nodes, that must be replaced in the local memory of a processing node is simply overwritten. However, to ensure that the last remaining shared copy is not overwritten, the DDM has an "out" transaction that propagates up through the hierarchy until a directory entry is found for that block. If the entry shows that other copies exist, the out transaction terminates. If this is the last copy, however, the out transaction becomes an "inject" transaction. (If an exclusive block were to be replaced, the inject transaction would be generated immediately.) This inject transaction attempts to place the replaced block in the local memory of another processing node where an eligible location exists in an invalid state. However, it is possible that the place-finding attempt will fail because every other eligible location could be filled with shared or exclusive data. In this case a write-back of the replaced block to a disk subsystem occurs.

However, writing such block back to the secondary storage is undesirable for several reasons. First, such write-back to disk involves a disk access, which consumes at least an order of magnitude higher access time than a memory access. What is worse, a normal demand-paged operating system writes back an "entire" page when a request for a write-back to disk is received. Accordingly, when a block is to be replaced, the entire page (containing the block) will be written back, incurring an unbearable overhead that may nullify the advantage of the higher local memory utilization in the cache only memory architecture machine. If one desires to avoid this, he may have to alter the operating system paging scheme to maintain per-block information in the page table, which will be in itself an awkward task, let alone its side-effects. Either option requires operating system intervention on every block replacement, which is clearly undesirable.

SUMMARY OF THE INVENTION

It is, therefore, an object of the present invention to provide an improved block replacement policy which does not possess the above-mentioned problems.

It is another object of the present invention to provide a method for maintaining coherence among data stored in local memories of a bus-based cache only memory architecture multiprocessor, which incorporates the improved block replacement method.

In accordance with one aspect of the present invention, there is provided an improved block replacement method for use in a multiprocessor, the multiprocessor including a multiplicity of processing nodes connected via a system bus, each processing node having a local memory for storing data decomposed into a plurality of blocks, the local memory acting as a cache with no backing main memory provided in the multiprocessor, the method being invoked when a block in the local memory of a first processing node in the multiprocessor is to be replaced to make a space for an incoming block supplied via the system bus from the local memory of a second processing node in the multiprocessor, the method comprising the steps of:

(a) if the block of the first processing node is in an invalid state, or in a shared state, overwriting the block of the first processing node with the incoming block from the second processing node;

(b) if the block of the first processing node is in an exclusive state, or in a shared owner state meaning that the block of the first processing node carries with it a responsibility of supplying its copy to another processing node in the multiprocessor upon receiving an access request for such copy from said another processing node, relocating the block of the first processing node to a third processing node in the multiprocessor, selected in accordance with a predetermined priority scheme, and then overwriting the block of the first processing node With the incoming block from the second processing node; and (c) if the third processing node cannot be determined among the processing nodes in the multiprocessor with the predetermined priority scheme in step (b), swapping the block of the first processing node for the incoming block from the second processing node.

In accordance with another aspect of the present invention, there is provided a local memory coherence method for use in a multiprocessor, the multiprocessor including a multiplicity of processing nodes connected via a system bus, each processing node having a local memory for storing data decomposed into a plurality of blocks, the local memory acting as a cache with no backing main memory provided in the multiprocessor, the method comprising the steps of:

(a) associating state information with each block, the state information indicating the block's state as being in an invalid state, an exclusive state, a shared state, or a shared owner state;

(b) maintaining data coherence among the local memories in the multiprocessor by utilizing the state information; and (c) if, in step (b), there arises a need to replace a block in the local memory of a first processing node in the multiprocessor with an incoming block supplied via the system bus from the local memory of a second processing node in the multiprocessor, executing the steps of:

(c-1) if the block of the first processing node is in an invalid state, or in a shared state, overwriting the block of the first processing node with the incoming block from the second processing node, (c-2) if the block of the first processing node is in an exclusive state, or in a shared owner state, relocating the block of the first processing node to a third processing node in the multiprocessor, selected in accordance with a predetermined priority scheme, and then overwriting the block of the first processing node with the incoming block from the second processing node, and (c-3) if the third processing node cannot be determined among the processing nodes in the multiprocessor with the predetermined priority scheme in step (c-2), swapping the block of the first processing node for the incoming block from the second processing node.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
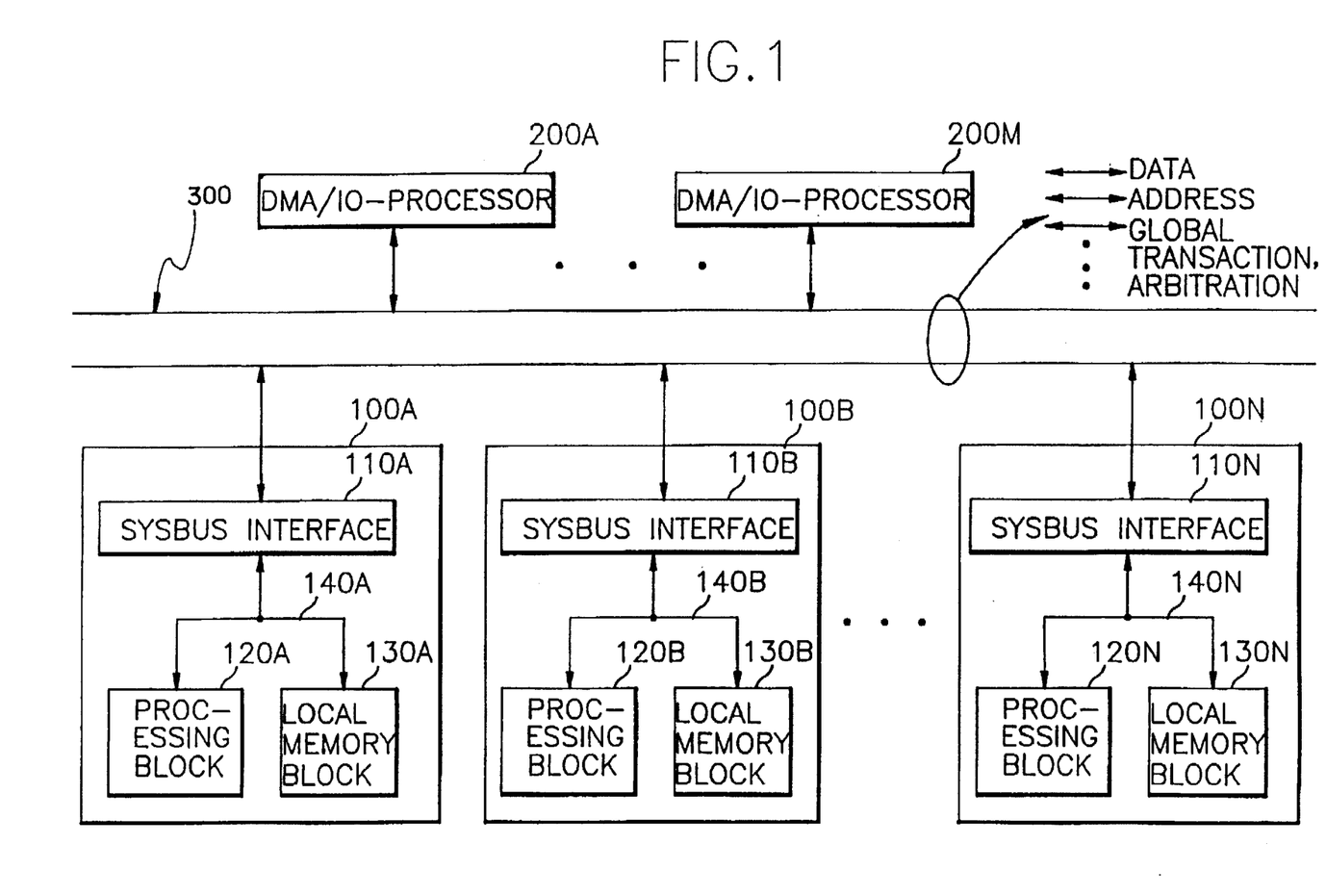
FIG. 1 illustrates a bus based multiprocessor employing cache only memory architecture, wherein the improved block replacement method of the present invention can be practiced.

Referring to FIG. 1, there is shown a schematic block diagram of a bus-based multiprocessor employing cache only memory architecture (hereinafter referred to as "DICE" which stands for Directly Interconnected Computer Elements), wherein the improved block replacement process of the present invention can be implemented. As shown, DICE comprises a multiplicity of processing nodes 100A to 100N, and shared system resources 200A to 200M, such as DMA/IO-Processors coupled with a disk sub-system(s) and the like (not shown), connected via a system bus 300.

The system bus 300 provides a communication path between the processing nodes 100A to 100N and DMA/IO-Processors 200A to 200M and includes three, i.e., a data, an address and a control, buses. The control bus has, in turn, various control lines including global transaction lines, arbitration lines, etc. The global transaction lines carry among the processing nodes 100A to 100N and DMA/IO-Processors 200A to 200M various system bus-oriented transactions including, e.g., a global read request, a global update request, a global read modified request, etc., which will be described in more detail hereinbelow.

Each processing node, e.g., 100A, comprises a system bus interface, e.g., 110A, a processing block, e.g., 120A, and a local memory block, e.g., 130A, connected via a local bus, e.g., 140A. (As all of the processing nodes 100A to 100N are identical, the description will be given with respect to processing node 100A only). As is conventional in the art, the local bus 140A provides a communication path among the system bus interface 110A, the processing block 120A and the local memory block 130A. The system bus interface 110A provides an interface between the system bus 300 and the processing node 100A, and further includes an arbitration mechanism which, through the arbitration lines of the system bus 300, organizes and controls access to the system bus 300 among the processing nodes 100A to 100N and the DMA/IO-Processors 200A to 200M according to a predetermined hierarchy of bus access requests.

Figure 2:
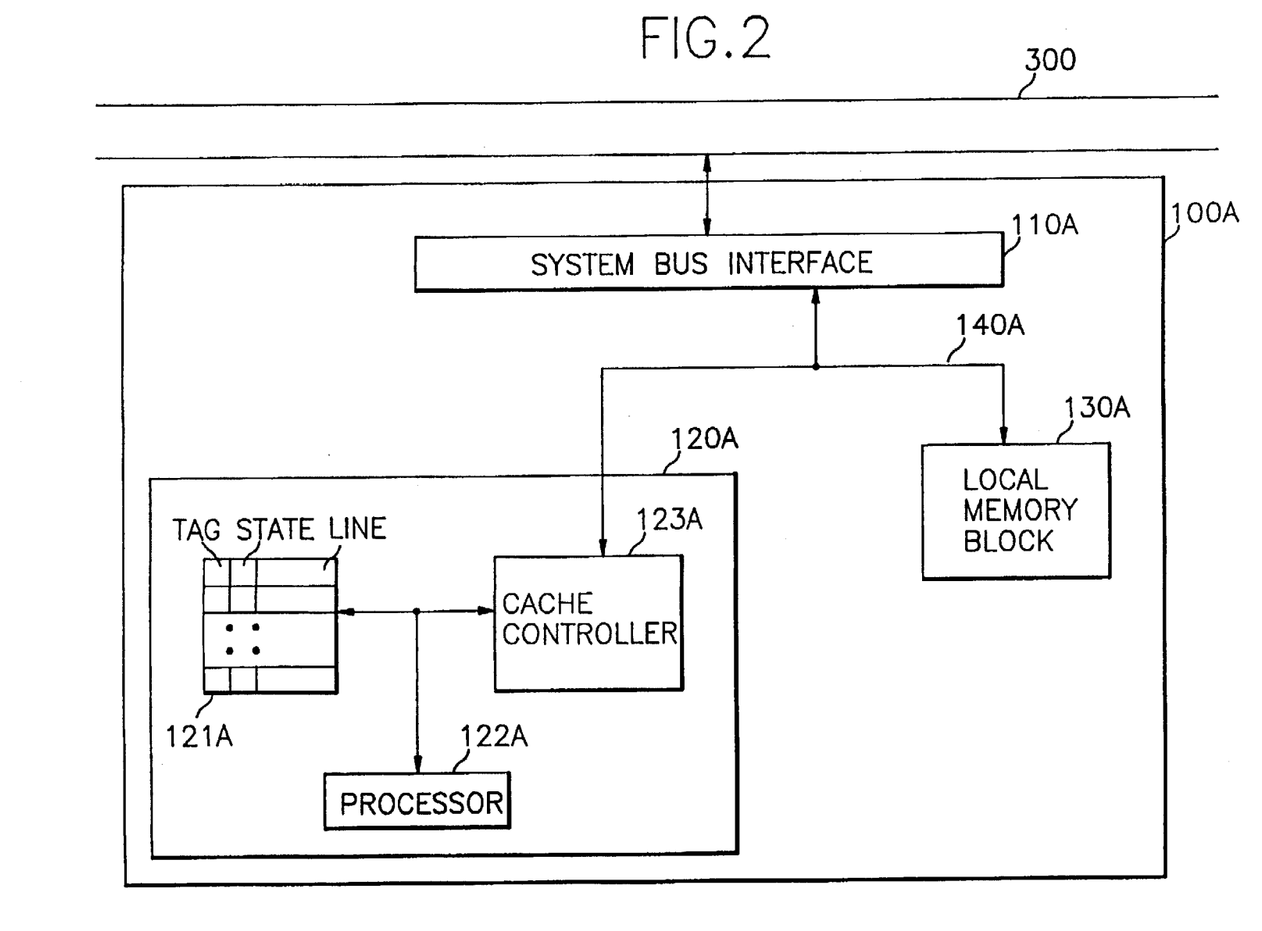
FIG. 2 presents a more detailed block diagram of a processing block shown in FIG. 1.

Referring to FIG. 2, there is shown a more detailed block diagram of the processing block 120A as is coupled to the local bus 140A. As shown in FIG. 2, the processing block 120A includes a cache memory 121A, a processor 122A and a cache controller 123A. The cache memory 121A stores data decomposed into a number of cache lines, along with their tag addresses. In addition, the cache memory 121A maintains one-bit state information for each cache line, which is required by a cache coherence protocol to be discussed in more detail hereinbelow. As such, when an address, divided into a tag and an index fields, for a cache line arrives at the cache memory 121A, the index field is used to access the cache memory 121A. The tag field is then compared with the tag address of the cache line read from the cache memory 121A. A match indicates that the cache memory 121A contains the desired cache line. The processor 122A may be any commercially available microprocessor, such as from the INTEL family or the MOTOROLA family of microprocessors, and includes an execution unit, a fetch unit, etc., not specifically shown for ease of illustration. Typically, the processor 122A operates by accessing data from the cache memory 121A or from the local memory block 130A, both under the control of the cache controller 123A implementing the cache coherence protocol.

Figure 3:
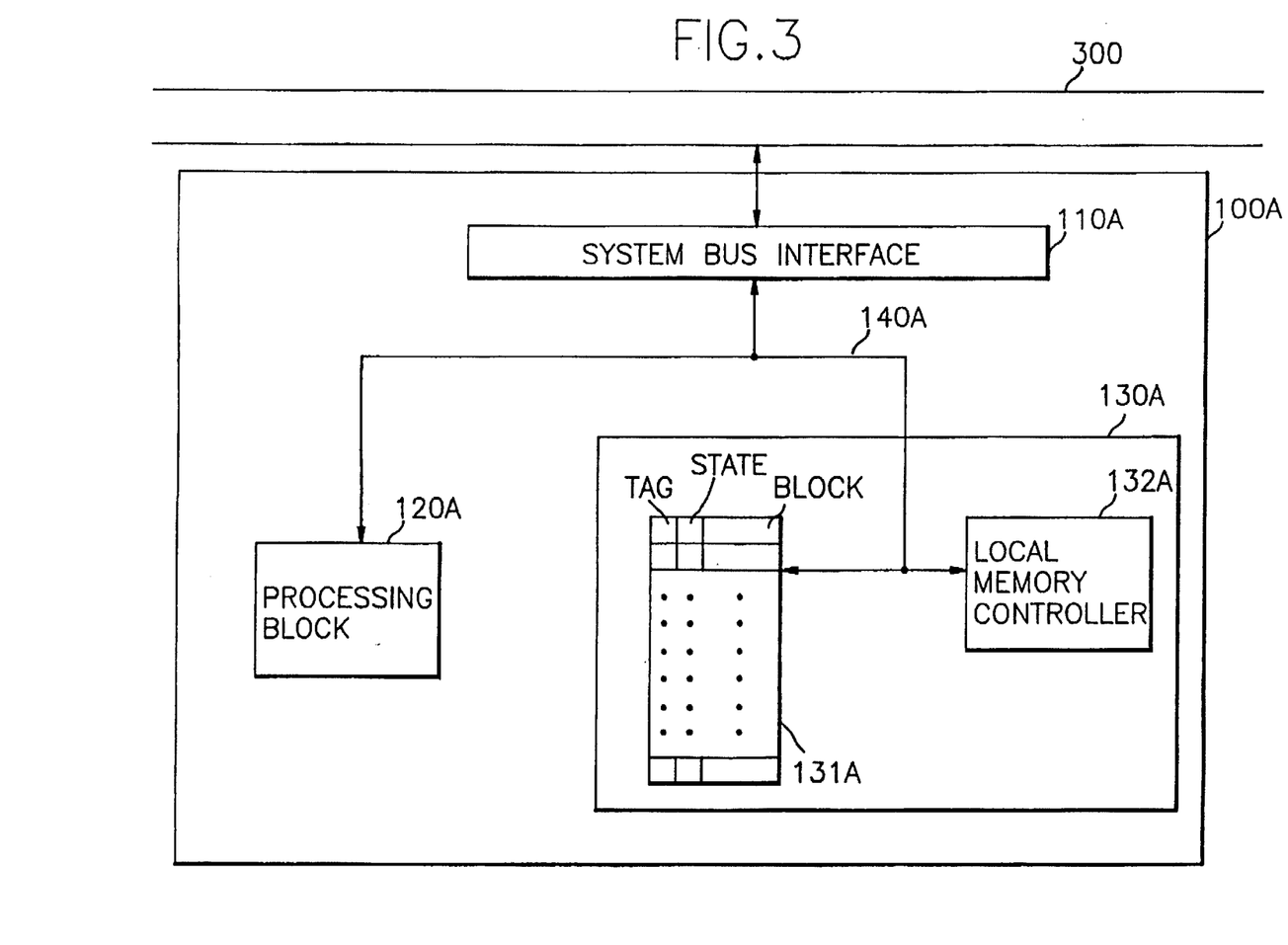
FIG. 3 depicts a more detailed block diagram of a local memory block shown in FIG. 1.

Referring to FIG. 3, there is shown a more detailed block diagram of the local memory block 130A. As shown in FIG. 3, the local memory block 130A includes a local memory 131A and a local memory controller 132A. The local memory 131A stores data decomposed into a plurality of blocks. Since, in DICE, local memories present another level of caching, the local memory block 130A is required to maintain a dedicated tag for each block cached in the local memory 131A. In addition, a local memory coherence protocol, which will be explained later, requires two-bit state information to be associated with each block cached in the local memory 131A. As such, when a single address, separated into a tag and an index fields, for a block is received from the processing block 120A and/or other processing nodes 100B to 100N over the system bus 300, the index field is used to access the local memory 131A. The tag field is then compared with the tag of the block read from the local memory 131A. A match indicates that the local memory 131A contains the desired block.

The local memory controller 132A has hardware for servicing a request received from the processing block 120A in the processing node 100A and for responding to a request received from other processing nodes 100B to 100N over the system bus 300 while maintaining a local memory coherence, by, e.g., comparing the tag field of a received address with the corresponding local memory tag, examining/modifying the local memory state information, sending an appropriate request over the system bus 300, etc., in accordance with the local memory coherence protocol.

As is well known in the art, a shared memory multiprocessor which employs multiple caches requires some sort of coherence protocol between the multiple caches to ensure the correctness of data contained therein. For example, upon a write to a shared block in a cache, the fact that a value in that block has changed must be reflected to all other caches. Since the local memories in DICE presents another level of caching, a coherence protocol is also required between the local memories.

The problem of maintaining coherence between the local memories in DICE is similar to that of a traditional shared memory machine, except that there is no globally shared backing main memory; and, therefore, the local memory coherence protocol of DICE may be based either on a write-update scheme or on a write-invalidate scheme. In the preferred embodiment of the present invention, however, the local memory coherence protocol is based on a write-update scheme, as simulation results shows the write-update scheme outperforms the write-invalidate scheme with respect to DICE. Further, in the preferred embodiment of the present invention, the coherence protocol employed between a cache memory and a local memory in a processing node follows a write-through scheme with a cache memory invalidation on every local memory update from other processing nodes, although other scheme, such as a write-back scheme, can be equally adopted.

As stated above, the write-through cache coherence protocol requires one-bit state information to be associated with each cache line in a cache memory. When the bit is asserted, it is indicated that the corresponding cache line is invalid, i.e., is not a current, up-to-date copy, and vise versa. On the other hand, the local memory coherence protocol requires two-bit state information to be associated with each block in a local memory. A block in a local memory can be in one of the following states:

* invalid (INV):—The block is not a current copy.
* Exclusive (EXL):—The block is the only valid copy in the system.
* Shared (SHA): The block is a valid copy, and there is at least one other valid copy in the system.

In addition to these states which take on the traditional meanings as used in various coherence schemes, the local memory coherence protocol of the present invention supports a fourth state:

* Shared Owner (SHO):—The local memory is the designated owner of the block and other valid copies may also be present in the system. A block in a local memory changes its state from EXL to SHO when a copy is supplied to a local memory in another processing node. The explicit ownership (SHO) as well as the implicit ownership (EXL) carries with it a responsibility to supply requesting nodes with copies and cannot be simply overwritten during a block replacement as will be described later.

By employing such SHO state, the decision of which processing node will supply a copy is simplified. Further, as will be discussed below, the ambiguity involved during a shared block replacement is reduced.

The combined cache and local memory coherence protocols ensure that the processors in DICE system do not access stale data. The combined cache and local memory coherence protocols will now be described with reference to FIGS. 1, 2 and 3, assuming that a processor, e.g., 122A, within a processing node, e.g., 100A, has issued a request for data. As is conventional, when a processor desires to read/write a data, it first provides a physical address thereof along with a read/write control signal to the associated cache controller, e.g., 123A.

Read hit: Upon receiving a read request from the processor 122A, the cache controller 123A checks the tag and the state bit of the cache line accessed from the cache memory 121A by using the index field of the physical address accompanying the read request. If the cache controller 123A finds that the desired cache line is present without the assertion of the state bit in the cache memory 121A (a "cache read hit"), the desired cache line is transferred to the processor 122A via the cache controller 123A.

Read miss: If, however, the desired cache line is not present or is in INV state in the cache memory 121A (a "cache read miss"), the cache controller 123A sends a memory read request to the local memory block 130A in the processing node 100A. The local memory controller 132A in the local memory block 130A checks the tag and the state bits of the block accessed from the local memory 131A in the local memory block 130A by using the tag field of the physical address accompanying the memory read request. If the local memory controller 132A finds that the requested block is present in EXL, SHO or SHA state in the local memory 131A (a "local memory read hit"), the requested block is supplied to the cache memory 121A which transfers the desired cache line in the requested block to the processor 122A via the cache controller 123A.

If, on the other hand, the local memory controller 132A determines that the requested block is not present or is in INV state (a "local memory read miss"), it sends a wait signal to the processor 122A via the cache controller 123A and arbitrates for gaining access to the system bus 300 using the arbitration mechanism in the system bus interface 110A. Once it has the bus, it places a global read request on the global transaction lines of the system bus 300. All nodes 100B to 100N, other than node 100A, are potential slaves and will snoop the physical address accompanying the global read request. The tag field of the physical address will be compared to the tags of their local memories 131B to 131N for a hit with SHO or EXL coherence state. This is how the local memory coherence protocol identifies which processing node in the system will respond to the global read request. A single processing node, e.g., 100B, that detects ownership of the requested block, whether it is explicit (SHO) or implicit(EXL), will respond to the global read request as a slave. Once the local memory controller 132B of the processing node 100B has supplied a copy of the requested block, the state of the requested block will be changed to SHO from EXL, or left unchanged if the original state was SHO in the local memory 131B. The local memory controller 132A of the requesting node 100A will then store the copy in its local memory 131A at the location indicated by the index field of the physical address, replacing a previously stored block (if any), and changes the state of the newly stored block to SHA. (At this point, it is to be reminded that, unlike traditional shared memory machines, there is no backing main memory in DICE. So, unlike a conventional shared memory multiprocessor, a block may not simply be overwritten in a local memory when the block is in SHO or EXL state, as this may be the last copy in the system. As will be described hereinbelow, in accordance with the block replacement process of the present invention, such previously stored block will be relocated to a local memory in another processing node, or swapped for the incoming block, without a disk sub-system access.) Now the cache controller 123A of the processing node 100A is allowed to complete the original transaction through the same procedure as described in connection with the local memory read hit.

Write hit: Upon receiving a write request from the processor 122A, the cache controller 123A checks the tag and the state bit of the cache line accessed from the cache memory 121A by using the index field of the physical address accompanying the write request. If the cache controller 123A finds that the desired cache line is present without the assertion of the state bit in the cache memory 121A (a "cache write hit"), the desired cache line is updated in the cache memory 121A and the write request goes through to the local memory block 130A via the cache controller 123A. The local memory controller 132A then checks the tag and the state bits of the block accessed from the local memory 131A by using the tag field of the physical address accompanying the write request. A write to a block that is in EXL state in the local memory 131A results in no further coherence action. If, however, the state of the block is in SHA or SHO state, a global update request is broadcasted on the system bus 300. All processing nodes with a copy of the block update their copies.

Write miss: If, however, the desired cache line is not present or is in INV state in the cache memory 121A (a "cache write miss"), the cache controller 123A sends a memory write request the local memory block 130A. The local memory controller 132A checks the tag and the state bits of the block accessed from the local memory 131A by using the tag field of the physical address accompanying the memory write request. If the local memory controller 132A finds that the requested block is present in EXL, SHA or SHO state in the local memory 131A (a "local memory write hit"), the requested block is updated in the local memory 131A, and the updated block is supplied to the cache memory 121A. Further, if the requested block is in SHA or SHO state, a global update request is broadcasted on the system bus 300. All processing nodes with a copy of the requested block update their copies in their local memories and invalidate the corresponding cache lines in their respective cache memories.

If, on the other hand, the local memory controller 132A determines that the requested block is not present or is in INV state (a "local memory write miss"), it sends a wait signal to the processor 122A via the cache controller 123A and arbitrates for gaining access to the system bus 300 using the arbitration mechanism in the system bus interface 110A. Once it has the bus, it places a global read modified request on the system bus 300. All processing nodes 100B to 100N having a copy of the requested block will update their copies in their local memories and invalidate the corresponding cache lines in their respective cache memories. A single processing node, e.g., 100B, that detects ownership of the requested block, whether it is explicit(SHO) or implicit (EXL), will respond to the requesting node, i.e., processing node 100A, with the updated copy of the block. Once the local memory controller 132B of the processing node 100B has supplied the updated copy, the state of the requested block in the local memory 131B will be changed to SHO from EXL, or left unchanged if the initial state was SHO. The local memory controller 132A of the requesting node 100A then stores the updated copy in its local memory 131A at the location indicated by the index field of the physical address, replacing a previously stored block (if any); changes the state of the newly stored block to SHA state in the local memory 131A; and supplies the updated copy to the cache memory 121A.

Hereinafter, the novel block replacement process of the present invention will be described.

As explained above, in a local memory, when a response to a global read request or a global read modified request comes in and there is no space for the block to go, then some sort of block replacement is to be done.

As stated previously, unlike a traditional shared memory multiprocessors, there is no backing main memory in DICE, restricting removal of a valid copy from a local memory during a block replacement. In conventional cache only memory machines, such as DDM, a shared block is simply overwritten if it is not the only copy in the system. If, after a directory search, it is determined that the block is the only remaining copy in the system, that copy is made exclusive, and an attempt to relocate the copy to an invalid location in another processing node is made. If no such location can be found, the entire page containing the replaced block is written back to a disk storage. As discussed above, the problems of this policy lie in wasting disk bandwidth and potentially involving operating system intervention on every block replacement.

In accordance with the present invention, however, a shared state is further divided into SHA and SHO states, reducing the ambiguity involved during a shared block replacement. That is, on a shared block replacement, if the block is in SHA state, recognizing that there must be at least one copy of the block in another processing node, the block is replaced without any further consideration.

Further, when a block in SHO or EXL state is to be replaced, an attempt to relocate the block to a location in another processing node is made in accordance with an improved priority scheme of the present invention. Should such attempt fail, the block is swapped for the incoming block. In other words, after the swap, the processing node supplying the newly referenced block will have the replaced block in the location of the newly referenced block. Thus, even an exclusive block is guaranteed to fine a place to go; and, therefore, no write-back to disk is required during a block replacement incurred by a global read request or a global read modified request.

Figure 4:
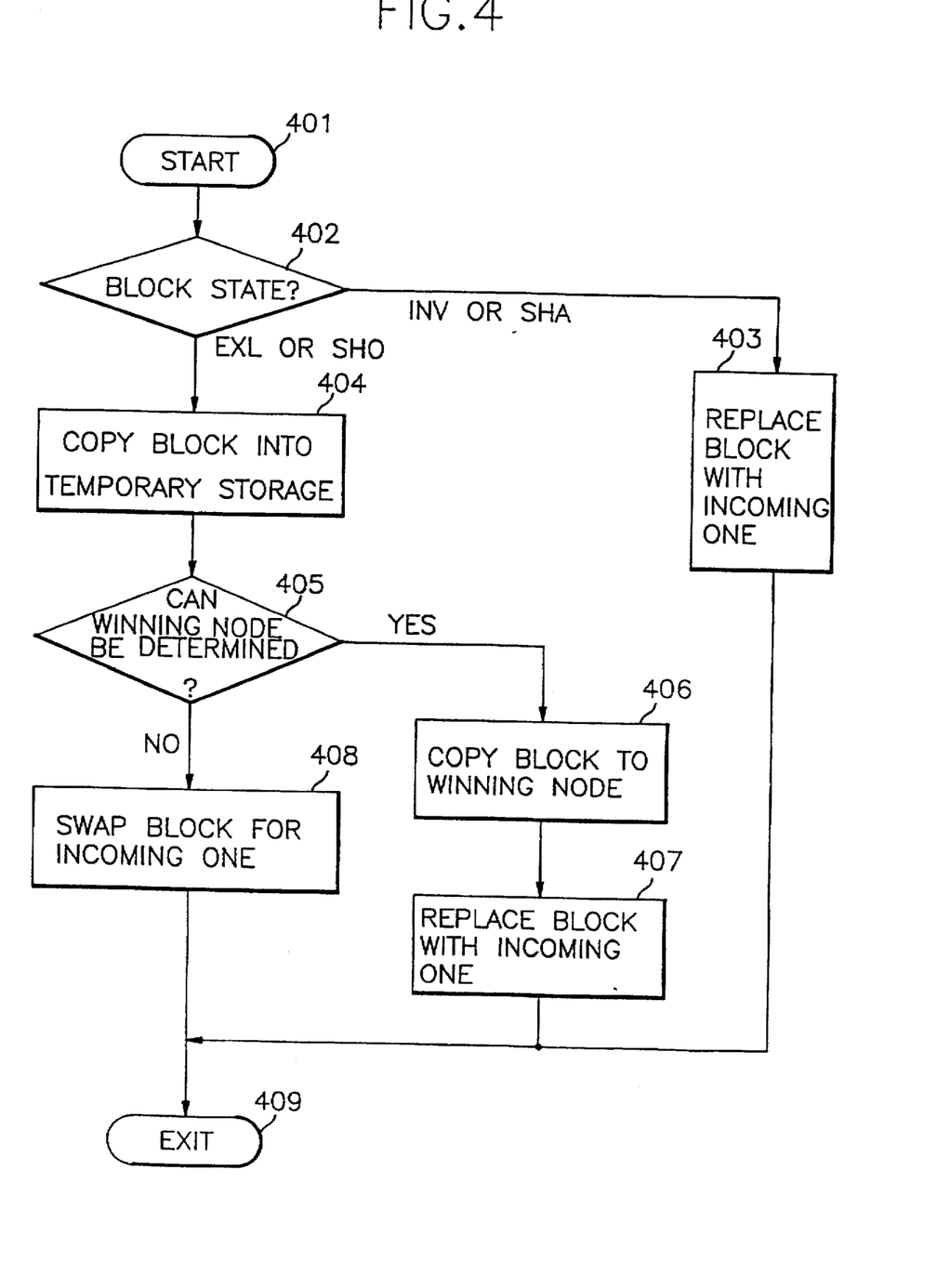
FIG. 4, offers a flowchart of the block replacement process of the present invention.

Referring to FIG. 4, there is illustrated a flowchart of the block replacement process of the present invention. As shown in FIG. 4, the process starts with step 401. After the start, in step 402, the process determine whether the block to be replaced is in INV or SHA state. If it is, in step 403, the process replace the block with the incoming block. Thereafter, the process proceed to step 409 to exit.

If, in step 402, the block to be replaced is in neither INV nor SHA state but in EXL or SHO state, in step 404, the process copies this block into a temporary storage, and then, in step 405, an attempt is made to determine which processing node will take this block by using a predetermined priority scheme of the present invention. The priority scheme uses three priorities: the highest priority, P1, will be given to a processing node whose block in its local memory, as accessed by the index field of the physical address of the block being replaced, has the same tag as the tag field of the physical address; the next priority, P2, will be given to processing nodes whose blocks in their local memories, as commonly accessed by the index field of the physical address, are in INV state but do not have the same tag as the tag field of the physical address; the third and lowest priority, P3, will be given to processing nodes whose blocks in their local memories, as commonly accessed by the index field of the physical address, are in SHA state but do not have the same tag as the tag field of the physical address. (In step 405, when a priority tie occurs among processing nodes, a winning node can be selected in various ways, e.g., randomly, in a round-robin fashion, etc.) If, in step 405, a winning node is determined among the processing nodes in DICE, in step 406, the block in the temporary storage is copied to the winning node. Subsequently, in step 407, the local memory location once occupied by the block being replaced will be overwritten with the incoming block.

If, however, in step 405, no winning node can be determined with the above priority scheme, in step 407, a swap of the block being replaced for the block that comes in occurs. Finally, the process exits at step 407.

The above priority scheme can be implemented by utilizing a distributed arbitration mechanism employed in, e.g., Futurebus+ standard (see *IEEE* 896.1 *Futurebus+ specification* for a more detailed description of Futurebus+ arbitration). As such, processing nodes with three different priorities can compete simultaneously for the system bus tenure using a single pass arbitration; and, therefore, deciding which processing node will take the block being replaced can be promptly and automatically performed.

Figure 5:
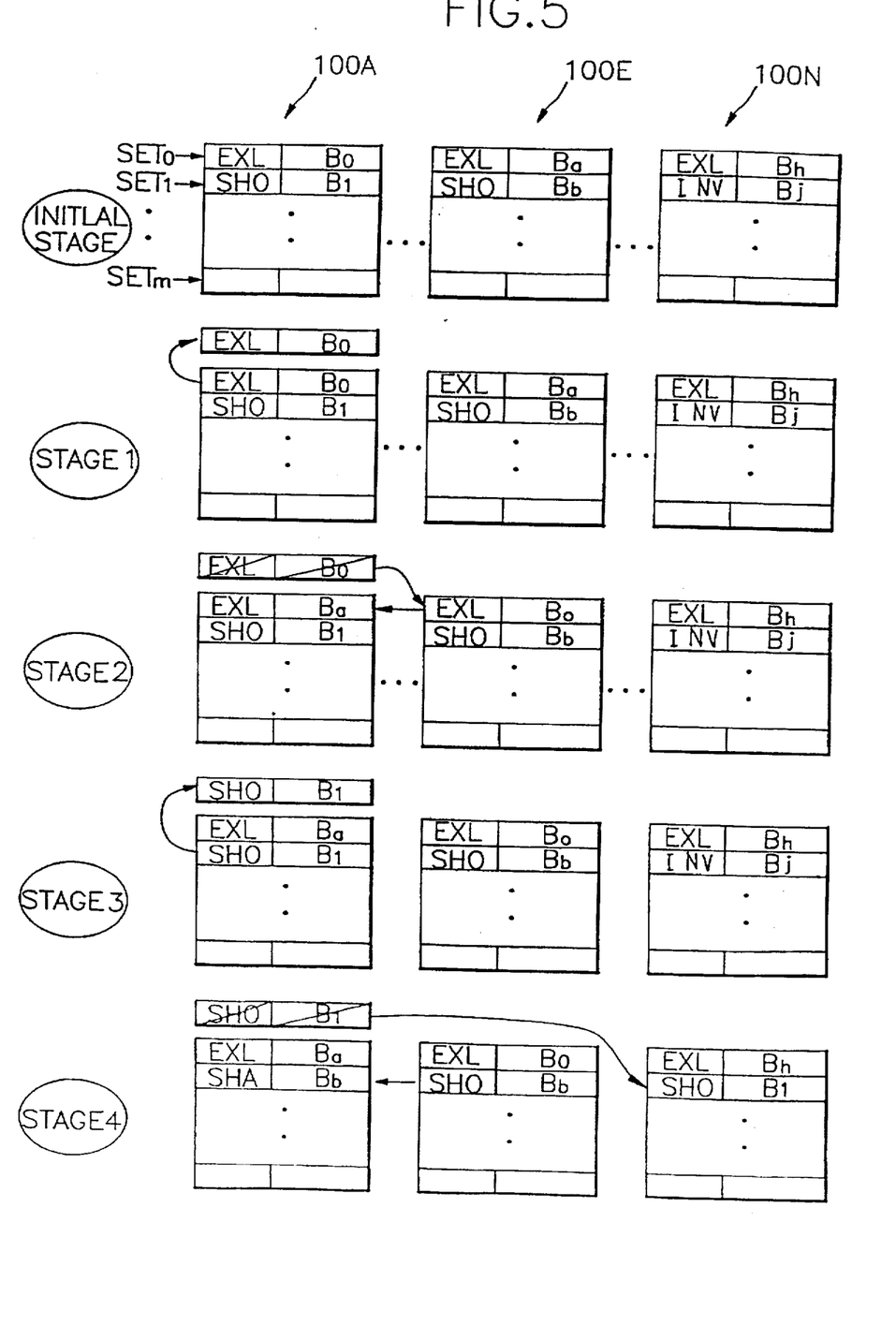
FIG. 5, shows how the block replacement process of the present invention applies to a specific example.

FIG. 5 shows how the block replacement process of the present invention applies to a specific example. In FIG. 5, a set refers to blocks commonly accessible by the index field of the physical address of a block.

First, consider a case where a processing node 100A currently holding a block $B_0$ in EXL state in $Set_0$ has a local memory read miss for a block $B_a$. Node 100E has the block $B_a$ also in EXL state in $Set_0$. The block replacement process of the present invention copies the EXL block $B_0$ into the temporary storage (stage 1). Thereafter, the process determines which node will take the EXL block $B_0$ by using the above-described priority scheme. In this case, assuming $Set_0$ is filled up with EXL blocks, no node is available for accommodating the EXL block $B_0$. Consequently, the process swaps the EXL block $B_0$ for the EXL block $B_a$ (stage 2), without any disk access.

The above example is straight forward because the options for the relocation of the EXL block $B_0$ are limited (actually, in this case, only one). However, when there exists several options for the relocation of a block in EXL or SHO in a set, the block replacement process should first attempt to relocate the block to another block in the same set. This is because forcing a swap of the block may lead to swap ping-ponging, similar to ping-ponging caused by false sharing in a write-invalidation scheme (see M. Dubios and J. C. Wang, "*Estimating the Ping Pong Effect in Cache Based Multiprocessors*", *Performance '87*, 1987) between two nodes that alternately access the same EXL or SHO block.

Consider a case where a node 100A currently holding a block $B_1$ in SHO state in $Set_1$ has a local memory read miss for a block $B_b$. Node 100E has the block $B_b$ in SHO state in $Set_1$. The block replacement process of the present invention copies the SHO block $B_1$ into the temporary storage (stage 3). Then, the process determines which node will take the SHO block $B_1$ by using the above-described priority scheme. In this case, node 100N will be given the priority of P2, since node 100N has, in $Set_1$, a block $B_j$ in INV state whose tag does not match the tag field of the physical address of the SHO block $B_1$; whereas node 100E is given no priority since node 100E has, in $Set_1$, the block $B_b$ in SHO state whose tag does not match the tag field of the physical address of the SHO block $B_1$. Assuming no node is given an equal or higher priority than P2, node 100N will take the SHO block $B_1$ (stage 4).

While the present invention has been shown and described with reference to the particular embodiments, it will be apparent to those skilled in the art that many changes and modifications may be made without departing from the spirit and scope of the invention as defined in the appended claims. For example, although in the above description, the cache and the local memories are described as to have an associativity of one, it would be appreciated to those skilled in the art that other associativity, for example, two-way set associativity, can be equally applied to the cache and the local memories in DICE. Further, a write-back protocol, instead of the write-through protocol, may be used between a cache memory and its associated local memory. In addition, a local memory coherence protocol employed among local memories can be modified to base on a write-invalidate scheme in an apparent way.

What is claimed is:

1. An improved block replacement method for use in a bus-based multiprocessor employing cache only memory architecture, the multiprocessor including a multiplicity of processing nodes connected via a system bus, each processing node having a cache memory contained in a processing block and a local memory for storing data decomposed into a plurality of blocks, the local memory acting as a cache with no backing main memory provided in the multiprocessor, the method being invoked when a block in the local memory of a first processing node in the multiprocessor is to be replaced to make a space for an incoming block supplied via the system bus from the local memory of a second processing node in the multiprocessor, the method comprising the steps of:

(a) managing blocks in the local memory by using information on block states, each block state for denoting a current state of each block stored in the local memory, the block states containing:

an invalid state in which the block is not a current copy, an exclusive state in which the block is the only valid copy in the multiprocessor, a shared state in which the block is a valid copy, and at least one other valid copy exists in the system, and a shared owner state in which the block of a processing node carries with it a responsibility for supplying its copy to another processing node upon receiving an access request for the block from said another processing node;

(b) if the block of the first processing node is in the invalid state, or in the shared state, overwriting the block of the first processing node with the incoming block from the second processing node;

(c) if the block of the first processing node is in the exclusive state, or in the shared owner state, relocating the block of the first processing node to a third processing node in the multiprocessor, selected in accordance with a predetermined priority scheme, and then overwriting the block of the first processing node with the incoming block from the second processing node; and (d) if the third processing node cannot be determined among the processing nodes in the multiprocessor with the predetermined priority scheme in step (c), swapping the block of the first processing node for the incoming block from the second processing node.

2. The improved block replacement method as recited in claim 1, wherein the predetermined priority scheme gives the highest priority to a processing node in the multiprocessor, whose block, as accessed by an index field of a physical address of the block of the first processing node, has the same tag as a tag field of the physical address; the next priority to processing nodes in the multiprocessors, whose blocks, as commonly accessed by the index field of the physical address, are in an invalid state and do not have the same tag as the tag field of the physical address; and the lowest priority to processing nodes in the multiprocessor, whose blocks, as commonly accessed by the index field of the physical address, are in a shared state and do not have the same tag as the tag field of the physical address.

3. The improved block replacement method as recited in claim 2, wherein the processing nodes with the three different priorities compete for a system bus tenure using a distributed arbitration mechanism.

4. A local memory coherence method for use in a multiprocessor, the multiprocessor including a multiplicity of processing nodes connected via a system bus, each processing node having a local memory for storing data decomposed into a plurality of blocks, the local memory acting as a cache with no backing main memory provided in the multiprocessor, the method comprising the steps of:

(a) managing blocks in the local memory by using information on block states, each block state denoting a current state of each block stored in the local memory, the block states containing:

an invalid state in which the block is not a current copy, an exclusive state in which the block is the only valid copy in the multiprocessor, a shared state in which the block is a valid copy, and at least one other valid copy exists in the system, and a shared owner state in which the block of a processing node carries with it a responsibility for supplying its copy to another processing node upon receiving an access request for the block copy from said another processing node;

(b) maintaining data coherence among the local memories in the multiprocessor by utilizing the state information; and (c) if, in step (b), there arises a need to replace a block in the local memory of a first processing node in the multiprocessor with an incoming block supplied via the system bus from the local memory of a second processing node in the multiprocessor, executing the steps of:

(c-1) if the block of the first processing node is in the invalid state, or in the shared state, overwriting the block of the first processing node with the incoming block from the second processing node, (c-2) if the block of the first processing node is in the exclusive state, or in the shared owner state, relocating the block of the first processing node to a third processing node in the multiprocessor, selected in accordance with a predetermined priority scheme, and then overwriting the block of the first processing node with the incoming block from the second processing node, and (c-3) if the third processing node cannot be determined among the processing nodes in the multiprocessor with the predetermined priority scheme in step (c-2), swapping the block of the first processing node for the incoming block from the second processing node.

5. The improved block replacement method as recited in claim 4, wherein the predetermined priority scheme gives the highest priority to a processing node in the multiprocessor, whose block, as accessed by an index field of a physical address of the block of the first processing node, has the same tag as a tag field of the physical address; the next priority to processing nodes in the multiprocessors, whose blocks, as commonly accessed by the index field of the physical address, are in an invalid state and do not have the same tag as the tag field of the physical address; and the lowest priority to processing nodes in the multiprocessor, whose blocks, as commonly accessed by the index field of the physical address, are in a shared state and do not have the same tag as the tag field of the physical address.

6. The improved block replacement method as recited in claim 5, wherein the processing nodes with the three different priorities compete for a system bus tenure using a distributed arbitration mechanism.

7. A multiprocessor comprising:

a system bus; and a multiplicity of processing nodes connected via the system bus, each processing node having a local memory means for storing data decomposed into a plurality of blocks, the local memory means acting as a cache with no backing main memory provided in the multiprocessor, wherein the local memory means includes:

a state information storage associated with the local memory, for storing a number of block states, each block state denoting the current state of each of data blocks stored in the local memory and the block states containing:

an invalid state in which the block is not a current copy, an exclusive state in which the block is the only valid copy in the multiprocessor, a shared state in which the block is a valid copy, and at least one other valid copy exists in the system, and a shared owner state in which the block of a processing node carries with it a responsibility for supplying its copy to another processing node upon receiving an access request for such copy from said another processing node; and block replacement means for, when a block in the local memory of a first processing node in the multiprocessor is to be replaced to make a space for an incoming block supplied via the system bus from the local memory of a second processing node in the multiprocessor, performing the replacement of the block of the first processing node by including:

means for, if the block of the first processing node is in the invalid state, or in the shared state, overwriting the block of the first processing node with the incoming block from the second processing node, means for, if the block of the first processing node is in the exclusive state, or in the shared owner state, relocating the block of the first processing node to a third processing node in the multiprocessor, selected in accordance with a predetermined priority scheme, and then overwriting the block of the first processing node with the incoming block from the second processing node, and means for, if the third processing node cannot be determined among the processing nodes in the multiprocessor with the predetermined priority scheme, swapping the block of the first processing node for the incoming block from the second processing node.

8. The multiprocessor as recited in claim 7, further comprising a cache memory coupled to the local memory means, wherein the cache memory has state information representing two cache states.

* * * * *